J. HARRIS.
PIPE WELDING MACHINE.
APPLICATION FILED SEPT. 25, 1918.
1,434,207.
Patented Oct. 31, 1922.
4 SHEETS—SHEET 3.
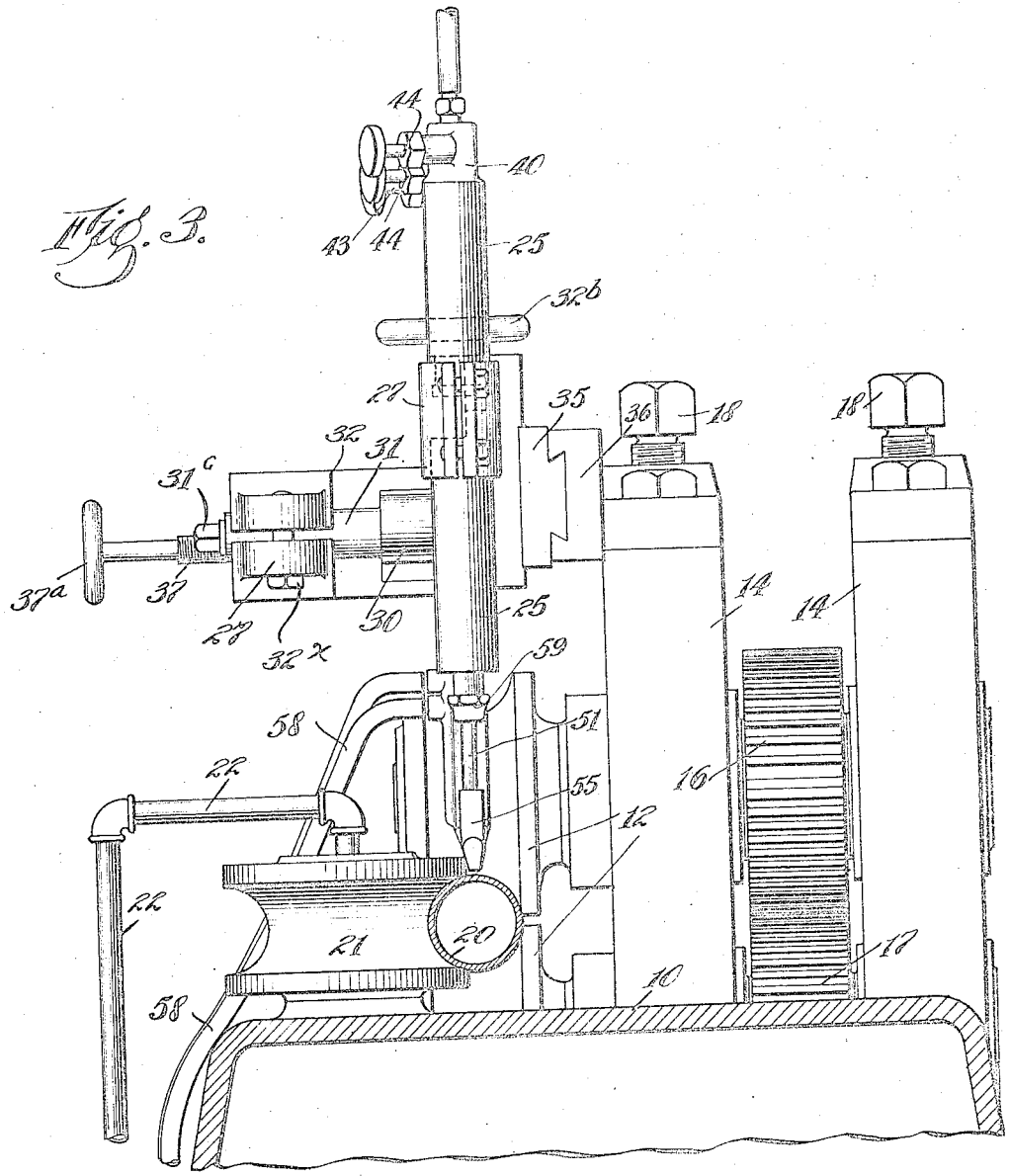
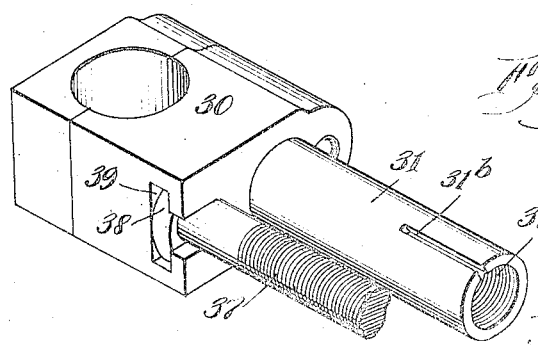

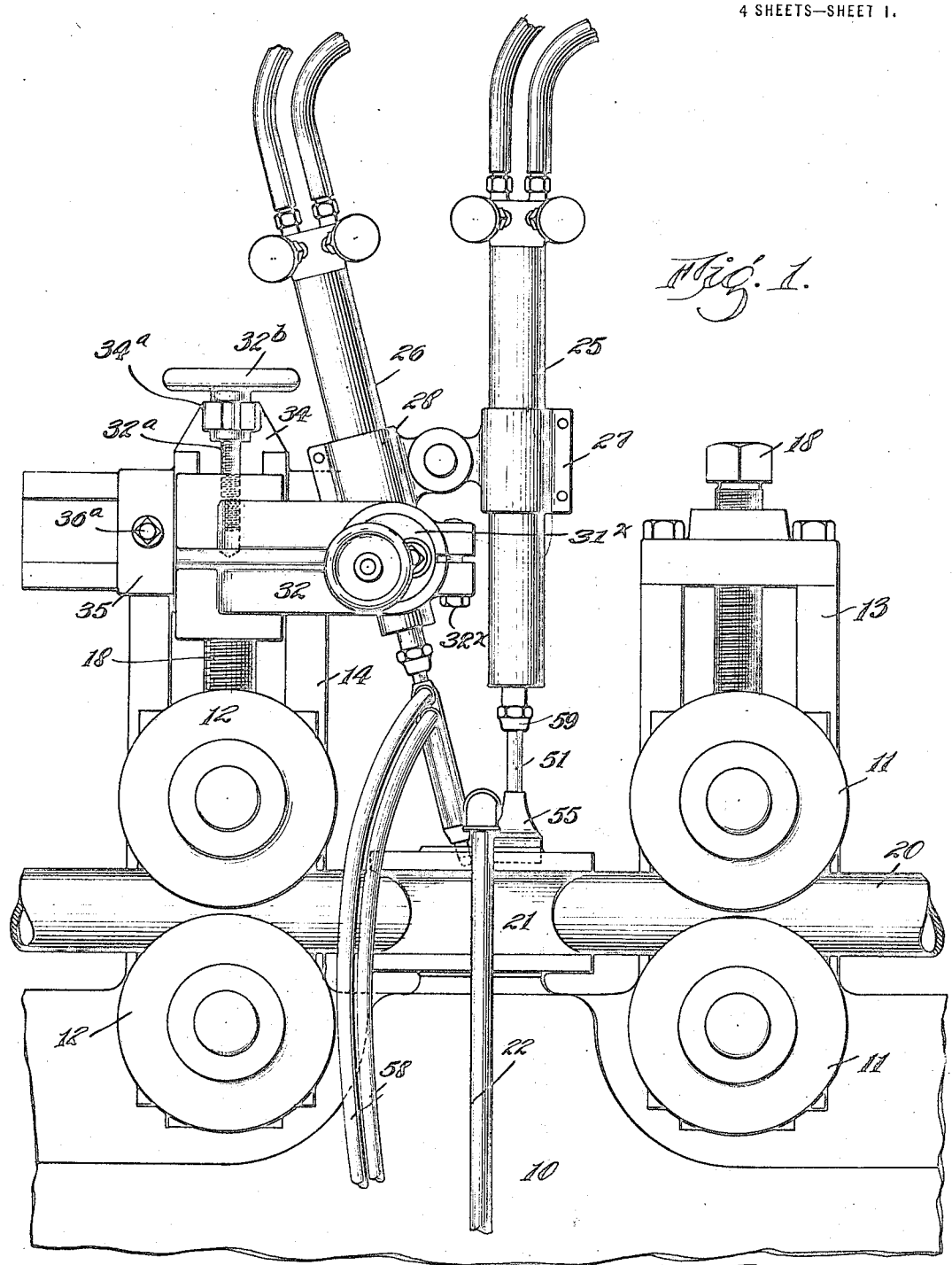

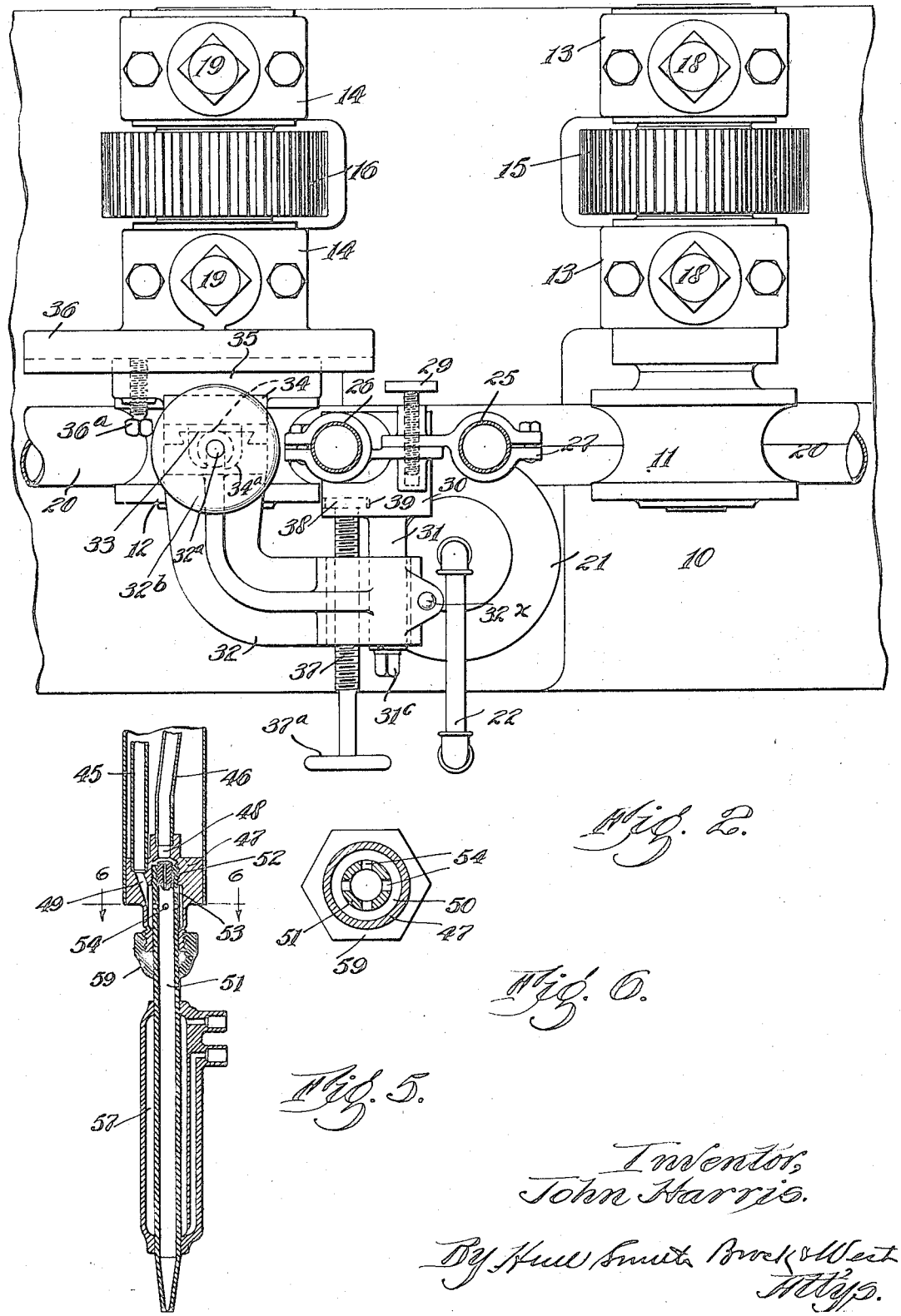

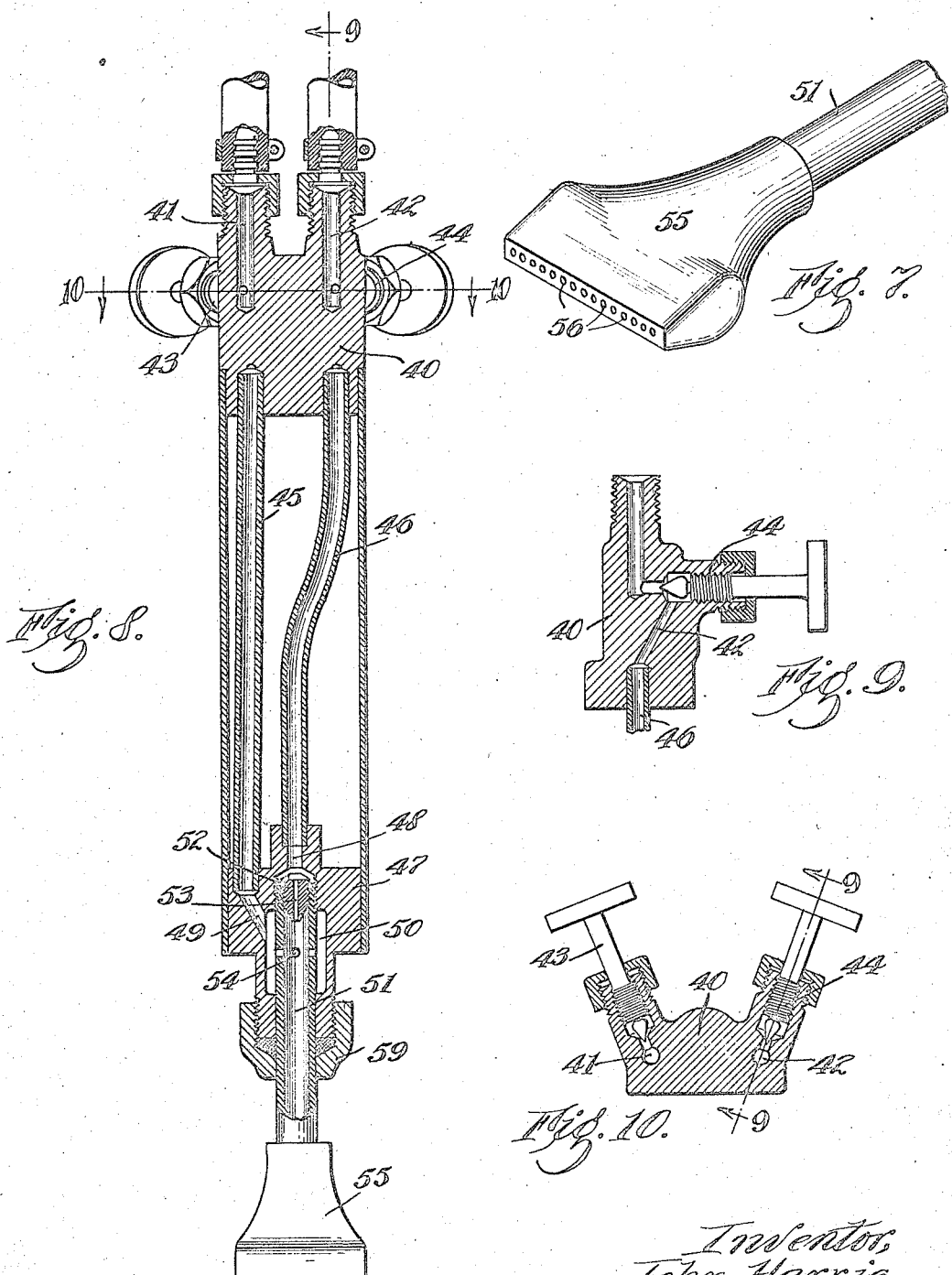

Patented Oct. 31, 1922.

1,434,207

UNITED STATES PATENT OFFICE.

JOHN HARRIS, OF LAKEWOOD, OHIO, ASSIGNOR OF ONE-HALF TO JAMES R. ROSE, OF EDGEWORTH, PENNSYLVANIA.

PIPE-WELDING MACHINE.

Application filed September 25, 1918. Serial No. 255,716.

*To all whom it may concern:*

Be it known that I, JOHN HARRIS, a citizen of the United States, residing at Lakewood, in the county of Cuyahoga and State of Ohio, have invented a certain new and useful Improvement in Pipe-Welding Machines, of which the following is a full, clear, and exact description, reference being had to the accompanying drawings.

This invention relates generally to a welding machine, and more particularly to a pipe welding machine, though it will be understood that the mechanism can be employed for welding other articles fed continuously through the same and subjected to the welding action of the blow pipes.

The object of the invention is to provide a simple and efficient device capable of various adjustments whereby the heating and welding flames can be directed in the most advantageous manner upon the continuously moving edges which are to be welded together.

Another object of the invention is to provide a device in which a minimum quantity of gases are employed to produce the maximum amount of efficient welding in the shortest space of time.

With these objects in view, and certain others which will become apparent as the description proceeds, the invention consists in the novel features of construction of the various parts, and in the manner of combining or arranging them, all of which will be fully set forth and pointed out in the appended claims.

In the drawings I have shown one embodiment of my invention and in which Fig. 1 is a face view or elevation of the same; Fig. 2 is a plan view thereof; Fig. 3 is an end view; Fig. 4 a detail perspective view of the adjustable blow pipe carrying block; Fig. 5 is a detail sectional view of the welding tip; Fig. 6 is a detail sectional view on the line 6—6 of Fig. 5; Fig. 7 is a detail perspective view of the preheating tip; Fig. 8 is a longitudinal sectional view of the blow pipe carrying the preheating tip; Fig. 9 is a detail vertical section of a portion of the blow pipe illustrating the valve thereof and Fig. 10 is a detail horizontal section on the line 10—10 of Fig. 9.

In carrying out my invention I employ a main frame or support 10 which may be of any desired construction and upon which are mounted the grooved guiding entrance rolls 11, and the grooved guiding exit rolls 12, there being two entrance rolls one above the other as shown, and two exit rolls also one above the other. These rolls are mounted upon shafts which are journaled in bearings 13 and 14, respectively, and which carry gears 15 and 16, respectively, meshing in turn with gears 17 which receive their power from any suitable source. The upper rolls are adjustable through the medium of the adjusting screws 18 and 19, respectively, and by means of which proper pressure can be applied to the pipe 20 which is fed between the aforesaid rolls it being understood that this pipe is shaped from sheet metal into tubular form with the edges thereof in close proximity to each other, this seam being arranged uppermost as the tube or pipe is fed through the machine so that the flames of the blow pipe can be brought to bear from these edges so that the metal can be welded into a homogeneous joint making a perfectly united seamless sheet metal tube or pipe. About midway between the vertical entrance and exit rolls 11 and 12 there is arranged a horizontal guiding and pressing roller 21 which is grooved and is so placed as to embrace the outer side of the tube or pipe as it passes through the machine, and inasmuch as this horizontal guide roller 21 is arranged very close to the welding torches for the purpose of holding the edges of the pipe close together it is desirable to have the roller water-cooled and this is accomplished by means of water supply pipes 22 leading through the guide roller 21.

The details of construction and the relative arrangement of the parts thus far described can be varied considerably so long as the pipe or tube to be welded is properly fed through the machine with a continuous movement and the edges of the joint or seam held in close contact, as the said tube or pipe is passed through the machine.

In order to produce a perfect weld in the least possible time and with the expenditure of the least amount of gases, I employ two blow pipes one to produce the preheating flame and the other the welding flame. The preheating flame is of considerable length in order to properly heat the meeting edges as they travel along beneath the preheating tip, and the welding flame is so arranged with reference to the preheating flame that it will become effective at the proper moment to produce a complete welding of the edges of the tube or pipe into a homogeneous joint.

The preheating blow pipe is shown at 25 and the welding blow pipe at 26, the central portion of the blow pipe 25 being arranged in the clamping arm 27, and the pipe 26 is arranged in a similar arm 28, these arms being provided with extensions which are pivotally and adjustably connected by means of a screw 29 and by connecting these pipes together in this manner their tips can be adjusted relatively with reference to each other in order to maintain said tips in the proper positions for the most efficient operation.

The pipe 26 is also clamped between the two portions of the block 30, the outer portion of said block having an arm 31 projecting therefrom, the outer end of said arm having a threaded recess or bore 31$^a$ which is made slightly tapering and a longitudinal slot 31$^b$ produced in the end of the arm communicates with the threaded recess 31$^a$. This arm 31 fits into a bearing 31$^x$ arranged in the bifurcated end of an arm 32 said arm being preferably right angular in shape and the members of the bifurcated end are clamped tight upon the arm 31 by means of the bolt 32$^x$ and in order to make the connection between the arm and bearing 31$^x$ more secure I provide a tapered plug 31$^c$ which is screwed into the threaded recess 31$^a$ for the purpose of expanding the end of the arm within the bearing which is mounted in the bifurcated end of arm 32.

The inner end of the arm 32 is constructed with a vertical dove-tail 33 which is adapted to fit into the vertical dove-tail groove 34 of a block 35 and this block 35 has upon its rear face a horizontal dove-tail which engages the horizontal dove-tail groove or guideway of a plate 36 carried by the frame portion of the machine. A set screw 36$^a$ is employed to lock 35 at any desired point of its adjustment. The vertical adjustment of the arm 32 is accomplished by means of a screw 32$^a$ having a hand wheel 32$^b$ which rests upon a bifurcated projection 34$^a$ at the upper end of the block 34, the screw 32$^a$ screwing into the dove-tailed end of the arm, and the screw being held against vertical movement, the arm 32 will be moved up and down by turning the hand wheel 32$^b$ in the proper direction.

In order to move the block 30 backward or forward in a horizontal plane, and with it the blow pipes 25 and 26. I provide a screw 37 which works through the arm 32 adjacent the outer end thereof and this screw 37 has a circular head 38 thereon, which fits into a T-shaped groove or slot 39 produced in the end of the block 30. The screw 37 is provided at its outer end with a hand wheel 37$^a$ and by turning this wheel in the proper direction the block 30 can be shifted backwards or forwards as desired.

Thus it will be seen that I provide for adjusting the positions of the blow pipes with reference to each other through the medium of the adjustable clamps 27 and 28, and that I provide for the angular adjustment of the two blow pipes in unison by the pivotal connection between the block 30 and arm 32, and also provide for the vertical and horizontal adjustment of the arm 32 and all of the parts connected therewith by means of the dove-tailed guides and means for moving and locking the parts together.

I am therefore able to obtain any desired adjustment of the supporting and carrying members in order to bring the tips of the blow pipes into proper positions for effecting the efficient preheating and welding of the pipe edges.

The blow pipes 25 and 26 are substantially alike as to their top portions and each may be said to comprise a casting 40 having passages 41 and 42, controlled by valves 43 and 44 respectively, the passage 41 having a tube 45 communicating therewith and the passage 42 a tube 46 communicating therewith. The lower ends of these tubes 45 and 46 are fixed into a block or casing 47, the tube 46 entering the central portion of the block and communicating with a central bore 48, while the tube 45 enters at one side of the center and communicates with the passage 49, this passage communicating with an annular space 50 formed in the depending central portion of the block 47 and in which fits the upper portion of the tip 51, the extreme upper end of the tip being threaded both internally and externally, and screwed into the block 47 in direct line with the lower end of the tube 46, and a plug 52, having a bore 53, is screwed into the upper end of the tip 51, this plug being shaped substantially as shown and acting as an injector. A short distance below the injector plug, the tip is provided with apertures 54 which communicate with the annular space 50.

In the pipe 25 the lower end of the tip is formed with a head 55 which is contracted in one direction at its lower end and is elongated in the direction of the line of travel of the pipe through the machine and this elongated lower end has a plurality of jet openings 56 produced therein and through which the commingled gases are projected and burned producing a plurality of closely associated jets or flames which act directly upon the abutting edges of the seam of the pipe and preheat the same to the desired extent.

The extreme lower end of the tip 51 of the pipe 26 is contracted as shown at 57 so as to produce the proper welding jet or flame and it is preferred to surround this tip by means of a water jacket 57ª, this water jacket being provided with inlet and outlet ports to which the water pipes 58 are connected so that water can be circulated through the water jacket and the tip itself maintained at the proper temperature. The upper ends of the blow pipes have suitable gas supply pipes connected thereto. To the pipe 25, which is the preheating pipe there may be supplied oxygen and hydrogen or instead of hydrogen any other combustible gas capable of producing a non-oxidizing neutral flame and to the pipe 26 it is preferred to supply oxygen and acetylene, although any suitable gases may be employed, which, when combined will produce a non-oxidizing or neutral flame which will develop sufficient heat to produce the temperature necessary for the proper welding flame.

It will of course be understood that the oxygen is always delivered to the passage 42 and the tube 46 which communicates with the central bore of the tip, and that the other combustible gases, whatever they may be, introduced into the pipes 25 and 26 to combine with the oxygen to produce the preheating flame in the pipe 25 and the welding flame in the pipe 26, are introduced through the bore 41 and tube 45 and pass through the bore 49 into the annular space 50 and through the apertures 54 into the tip where they are commingled with the oxygen injected through the plug 52 so that a thorough commingling of the gases takes place in the tip.

A suitable gasket or nut 59 provided with a suitable packing is employed to securely hold the tip in place, this gasket or nut being screwed to the extreme lower end of the depending portion of the block 47. By means of the valves 43 and 44 the proper mixtures of the gases can be obtained.

By means of the preheating pipe having the tip provided with the elongated head having the plurality of jet openings arranged from end to end and in close proximity, I am able to properly preheat the edges, and by projecting the lower end of the welding tip at the proper angle and at the proper relative position with reference to the preheating tip I am able to effect a perfect weld while the pipe or tube is being fed continuously through the machine at a rate of speed heretofore unattained, and this rapidity of movement of the pipe to be welded is due to the proper positioning of the combined preheating and welding tips together with the proper admixture of gases for producing the proper temperatures of the preheating and welding flames.

Having thus described my invention, what I claim is:—

1. In a pipe welding machine, the combination with a preheating blowpipe, of a welding blowpipe, means for adjustably connecting said pipes whereby their angles of inclination with reference to each other may be varied, a support connected to one of said pipes, said support being vertically adjustable whereby both pipes can be moved in unison.

2. In a pipe welding machine, the combination with a preheating blowpipe, of a welding blowpipe, means for adjustably connecting said pipes together, a support connected to one of said pipes, said support being vertically and horizontally adjustable whereby said pipes are caused to move vertically and horizontally in unison.

3. In a pipe welding machine, the combination with a preheating blowpipe, of a welding blowpipe, adjustable means for connecting said pipes together, a support to which one of said pipes is connected, said support being vertically and horizontally adjustable, a portion of said support being adjustable at an oblique angle with reference to the other portions of said support.

4. In a pipe welding machine, the combination with a frame, of a supporting member horizontally adjustable thereon, an arm vertically adjustable upon the horizontal member, a support connected to said arm, said support being adjustable horizontally and rotatively, a preheating blowpipe connected to said support and a welding blowpipe adjustably connected to the preheating blowpipe.

5. In a pipe welding machine, the combination with a frame portion of a member horizontally adjustable upon said frame portion, an arm vertically adjustable upon said member, a pipe support pivotally connected to said arm, blowpipes connected together, one of said blowpipes being connected to said support.

6. In a pipe welding machine, the combination with an arm 32, of a pipe support carried thereby, said pipe support being capable of angular adjustment with reference to said arm, and means for adjusting the pipe support horizontally with reference to said arm, blowpipes adjustably connected together, one of said blowpipes being connected to said support.

7. In a pipe welding machine, a preheating blowpipe provided with a tip having an elongated opening, of a welding blowpipe having its tip arranged in close proximity to the tip of the preheating pipe, said blowpipes being adjustably connected together, a support to which one of said pipes is connected, said support being horizontally and rotatively adjustable, and an arm to which said support is connected.

In testimony whereof, I hereunto affix my signature.

JOHN HARRIS